United States Patent [19]

Ozawa

[11] Patent Number: 4,809,120
[45] Date of Patent: Feb. 28, 1989

[54] HEAD POSITION CONTROL SYSTEM
[75] Inventor: Hiromi Ozawa, Kawasaki, Japan
[73] Assignee: Fuji Electric Company Ltd., Kanagawa, Japan
[21] Appl. No.: 929,348
[22] Filed: Nov. 12, 1986
[30] Foreign Application Priority Data
Nov. 15, 1985 [JP] Japan ................. 60-256204
[51] Int. Cl.$^4$ .................. G11B 5/596; G11B 27/28
[52] U.S. Cl. ................. 360/78.14; 360/77.08; 360/98.01
[58] Field of Search ............ 360/77, 78, 75, 98
[56] References Cited
U.S. PATENT DOCUMENTS
Re. 32,075  1/1986  Harrison et al. .................. 360/77

FOREIGN PATENT DOCUMENTS
55-150161 11/1980 Japan .

Primary Examiner—Raymond F. Cardillo
Assistant Examiner—David L. Robertson
Attorney, Agent, or Firm—Spencer & Frank

[57] ABSTRACT

A plurality of reference information regions on disc surfaces are displaced from each other on respective disc surfaces with respect to spatial relative positions of heads corresponding to respective disc surfaces. During one rotation of the discs, reference information is read out from the regions mutually displaced on the surfaces of a plurality of discs. Every time that the reference information is read out, a deviation of each head from a normal or proper head position in relation to a specific track is detected, so that in response to a deviation thus detected, a position of each head is corrected.

16 Claims, 7 Drawing Sheets

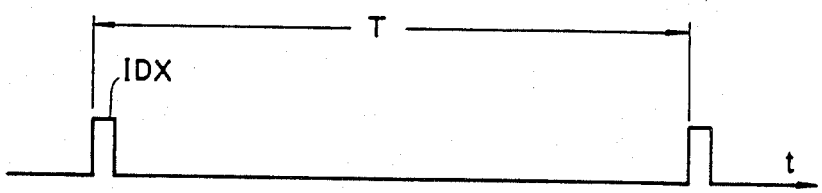
FIG. IA
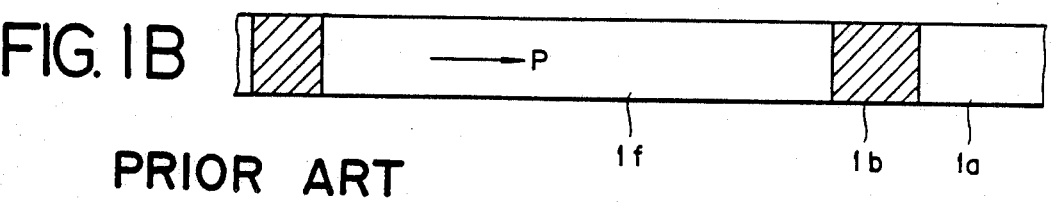
FIG. IB
PRIOR ART
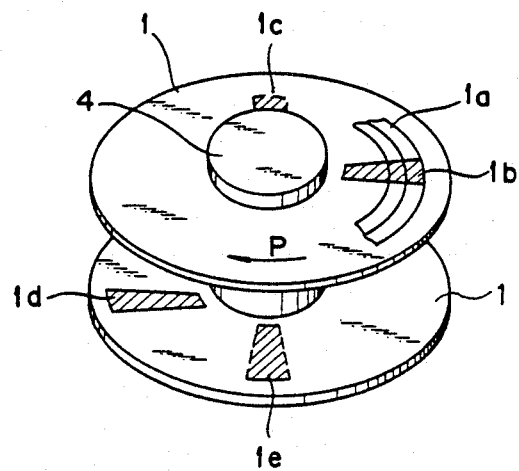
FIG. 3

HEAD POSITION CONTROL SYSTEM

BACKGROUND OF THE INVENTION

1. FIELD OF THE INVENTION

The present invention relates to a head position control system for a disc storage unit in which reference information is read out from a disc-shaped storage medium through a head to detect a position of the head so as to control the position.

2. DESCRIPTION OF THE PRIOR ART

In the disc storage unit of the type described above, the head must be displaced from one track to a specific track and must be properly positioned in relation to this specific track or data. As is well known in the art, in order to shift and properly position the head in relation to the specific track of data at a particular radius on the disc, open and closed loop systems have been used. In case of the open loop system, only a signal representative of a shift distance of the head such as a predetermined number of pulses is applied to a stepping motor and the present position of the head is not detected at all so that the position control in a strict sense is not carried out. The open loop system has been widely used in the case of a disc storage unit in which it is not necessary to precisely position the head in relation to a specific track of data at particular radii of the disc.

A data-packaging density of a disc storage unit, however, has been greatly increased recently so that a pitch between adjacent tracks becomes narrower. As a result, various problems arise when the head is even slightly deviated from its correct position, and thus demand for a clsoed loop control system has increased.

In the case of the closed-loop position control method, the present position of the head must be detected and applied as an actual value to a position control circuit. For this purpose, reference information or servo information to be used to detect the position of the head must be written on the disc. Therefore, the closed loop system is sometimes called a servo system. The servo system includes a servo-surface-servo system and a data-surface servo system.

In the case of the servo-surface-servo system, one surface of a storage disc is exclusively used for the storage of reference information so that information representative of the present position of the head can be read out from the reference information storage surface at any time independently of the operation for writing or reading out data onto or from the other surface of the disc. As a result, in response to the reference information stored on the one surface of the disc, the position of the head can always be corrected so that the head can be properly positioned in relation to a specific track of data. This system, however, has an inherent defect in that the data storage capacity is considerably reduced, since one of the surfaces of the disc must be exclusively used for the storage of reference information as described above.

On the other hand, in case of the data-surface-servo system, reference information is written only into one portion of each track of data in the circumferential direction. Therefore, unlike the servo-surface-servo system, the head position information cannot be read out at any time, but in general it suffices to correct the position of the head in response to the reference signal read out every time when the disc makes one rotation. Therefore, the data-surface-servo system has the distinct advantage that the space for the storage of reference information on the surfaces of the disc can be reduced and accordingly the data storage capacity need not be greatly reduced.

The present invention is directed to the data-surface-servo system of the type described above.

However, the prior art data-surface-servo system has a relatively long seek time required for shifting the head from one track to a specific track and then positioning it properly at a specific track position, so that an access time required for finding a desired track for the writing or reading of data becomes longer, as will be described in detail hereinafter with reference to FIGS. 1 and 2.

FIG. 1B is a developed view showing one track $1a$ on the disc and reference information is written into a hatched portion thereof. A period of rotation of the disc 1 is T and the direction of the rotation thereof is indicated by P. FIG. 1B corresponds to one of the most typical servo-surface-servo systems or a so-called index burst system in which the reference information $1b$ is written at one position at the end of the period of the rotation T. In the remaining region $1f$ corresponding to the remaining time interval of the period of the rotation T left after the reference information stored, there are provided, for instance, 32 data storage sectors defined and spaced apart from each other by a suitable gap in the longitudinal direction of the track $1a$. Each sector includes of course a data area into which required data is written or from which required data is read out, and an area for the storage of formatting data, an area for the storage of sync data for a read/write circuit and a margin area.

FIG. 1A shows an index pulse IDX in response to which the reference information $1b$ is written and the data is written into or read out from the region. $1f$. The index pulse IDX is synchronized with the rotation of the disc and is generated during the period of rotation T by a spindle motor 3 shown in FIG. 4 for rotating the disc.

FIG. 2 shows a flow of the steps of the seek operation in the above-described servo-surface-servo system. The operation is started when a disc storage unit such as a fixed disc unit receives a seek command from a computer at step S1. For instance, the seek command is in the form of the number of tracks between a starting track along which the head is positioned and a specific track of data to which the head must be shifted and properly positioned. In response to the seek command, a predetermined number of stepping pulses are applied to the stepping motor for rotating the disc so that the head is shifted at step S2. In the subsequent step S3, suitable means is used to judge whether or not the head is shifted to the specific track of data and the steps 2 and 3 are repeated until the judgement becomes affirmative, i.e., "YES". Even after the heat has been brought to the specific track 1a, a hunting phenomenon occurs for a while before and after the head reaches the specific track, so that next step S4 is provided for settling down the hunting.

At step S5, the reference information $1b$ is read out after the hunting has been competely settled down and in the succeeding step S6, a deviation of the head from a proper or correct position, i.e., an amount of off-track is detected and then a judgement is made whether the detected deviation or off-track is within a predetermined tolerance band or not. If the deviation or off-track is in excess of a predetermined tolerance band, the position of the stepping motor is corrected at step S7 and thereafter the operation returns to step S5. In general, steps S5, S6 and S7 are repeated a few times and only after the off-track is eliminated will the operation proceed from step S6 to step S8. At step 58, the signal representative of the completion of the seek operation is generated and delivered to the computer. Thus, the seek operation is completed.

In the fixed disc unit, a time required for completing the seek operation is equal to an average access time required for the head to travel ⅓ of one whole track, for instance, about 100 msec. The problem resides in the time required for reading out the reference information 1b at step S5. When the rotational speed of the disc is 3600 RPM, the sampling period for reading out the data once per rotation of the disc is about 17 msec. In addition, as described above, steps S5–S7 are repeated two or three times and accordingly the step 5 alone requires 34–51 msec. In other words, a time equal to about ⅓—½ of the seek time is used only in the step for reading out the reference information. This is the main reason why the conventional data-surface-servo system requires a substantially long access time for reading and writing information.

In order to eliminate the defect that the access time is long, the time required for completing step S5 can be reduced to 1/n by writing n pieces of reference information into a plurality of positions, respectively, in the circumferential direction of the track. However, the storage capacity is reduced or sacrificed accordingly. In addition, the reference information must be inserted between the data storage sectors and as a result, the data format of the tracks and a write-read circuit are complicated. In view of the above, the format called soft sector in which all sectors are defined continously as described above is advantageous, so that it is preferable to use the reference information in the above-described system as much as possible.

SUMMARY OF THE INVENTION

The primary object of the present invention is to substantially overcome the problems and defects encountered in the prior art head position control methods so that a read period of reference information in the data-surface-servo system is shortened, so that an access time for the reading or writing of data can be shortened without sacrificing the storage capacity.

Another object of the present invention is to attain the above-described primary object while taking advantage of the soft sector format in which all sectors are continuous in each track.

According to the present invention, a plurality of reference information regions on disc surfaces are displaced from each other on respective disc surfaces with respect to spatial relative positions of heads corresponding to respective disc surfaces. During one rotation of the discs, reference information is read out form the regions mutually displaced on the surfaces of a plurality of discs. Every time that the reference information is read out, a deviation of each head from a normal or proper head position in relation to a specific track is detected, so that in response to a deviation thus detected, a position of each head is corrected.

In the first aspect of the present invention, a head position control system for a disc storage unit comprises:

means for, in the case of writing a plurality of tracks for storing information and writing reference information for detecting a position of each of a plurality of heads into a portion which partially interrupts the circumference direction of the plurality of tracks on each surface of a plurality of rotating discs as recording media, displacing regions for storing the reference information on each of a plurality of disc surfaces from one disc surface to another with respect to a spatial positional relationship of each of the regions with each of the heads corresponding to each of the disc surfaces;

means for reading out the reference information from the regions of a plurality of disc surfaces, which are mutually displaced, through the heads during one rotation of the discs;

means for detecting a deviation of each head from its normal position in relation to a specific track every time that the reference information is read out; and means for correcting a positional deviation of the head in response to the detected deviation.

Here, the regions for the reference information can be defined at one position in the circumferential direction on each disc surface and can be equi-angularly displaced from one on one disc surface to another on another disc surface.

The regions for the reference information on a plurality of disc surfaces of all disc surfaces can be mutually displaced from one on one disc surface to another on another disc surface.

The means for reading out the reference information may include means for sequentially switching the plurality of heads in synchronism with index pulses generated in synchronism with one rotation of the disc so as to sequentially read out the reference information from the mutually displaced regions for the reference information on the plurality of disc surfaces through the switched heads.

The means for reading out the reference information may include means for generating a plurality of index pulses in accordance with the number of the disc surfaces upon which the regions for the reference information are defined.

One of the plurality of index pulses can be generated in the form of composite pulse, in response to which a sequential order of the plurality of index pulses is determined.

A heat position control system may further comprise:

means for generating a head selection signal having a digital value is response to the index pulses; and means for applying the head selection signal to a head switching circuit to sequentially select a head corresponding to the digital value of the head selection signal.

Here, the head selection signal can be generated independently of a head selection signal used when a position of the head is not controlled. In response to a seek signal for commanding the position of the head, either of the two head selection signals can be selectively applied to the head switching circuit.

Each region for the reference information can be defined only at one position at the leading end of each of the tracks.

A head position control system may further comprise means for delivering an exterior index pulse for writing and reading data to a computer associated with the disc storage unit, in addition to an index pulse generated in synchronism with the rotation of the disc.

In the second aspect of the present invention, a head position control method for a disc storage unit comprises the steps of:

in case of writing a plurality of tracks for storing information and writing reference information for detecting a position of each of a plurality of heads into a portion which partially interrupts the circumference direction of the plurality of tracks on each of the surfaces of a plurality of rotating discs as recording media, displacing regions for storing the reference information on each of a plurality of disc surfaces from one disc surface to another with respect to a spatial positional relationship of each of the regions with each of the heads corresponding to each of the disc surfaces;

reading out the reference information from the regions of a plurality of disc surfaces, which are mutually displaced, through the heads during one rotation of the discs;

detecting a deviation of each head from its normal position in relation to a specific track every time that the reference information is read out; and correcting a positional deviation of the head in response to the detected deviation.

Here, the regions for the reference information can be defined at one position in the circumferential direction on each disc surface and can be equi-angularly displaced from one on one disc surface to another on another disc surface.

The regions for the reference information on a plurality of disc surfaces of all disc surfaces can be mutually displaced from one on one disc surface to another on another disc surface.

The step of reading out the reference information may include a step of sequentially switching the plurality of heads in synchronism with index pulses generated in synchronism with one rotation of the disc so as to sequentially read out the reference information from the mutually displaced regions for the reference information on the plurality of disc surfaces through the switched heads.

The step of reading out the reference information may includes a step for generating a plurality of index pulses in accordance with the number of the disc surfaces upon which the regions for the reference information are defined.

One of the plurality of index pulses can be generated in the form of composite pulse, in response to which a sequential order of the plurality of index pulses is determined.

A head position control method may further comprise the steps of:

generating a head selection signal having a digital value in response to the index pulses; and applying the head selection signal to a head switching circuit to sequentially select a head corresponding to the digital value of the head selection signal.

Here, the head selection signal can be generated independently of a head selection signal used when a position of the head is not controlled. In response to a seek signal for commanding the position of the head, either of the two head selection signals can be selectively applied to the head switching circuit.

Each region for the reference information can be defined only at one position at the leading end of each of the tracks.

A head position control method may further comprise a step of delivering an exterior index pulse for writing and reading data to a computer associated with the disc storage unit, in addition to an index pulse generated in synchronism with the rotation of the disc.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 1A and 1B are waveform and explanatory diagrams used to explain an arrangement of reference information on a track in a prior art data-surface-servo system in conjunction with a sync index pulse, respectively;

FIG. 3 is a perspective view showing an arrangement of reference information regions on the surfaces of discs which are used to carry out the present invention;

DETAILED DESCRIPTION OF PREFERRED EMBODIMENTS

Figure 2:
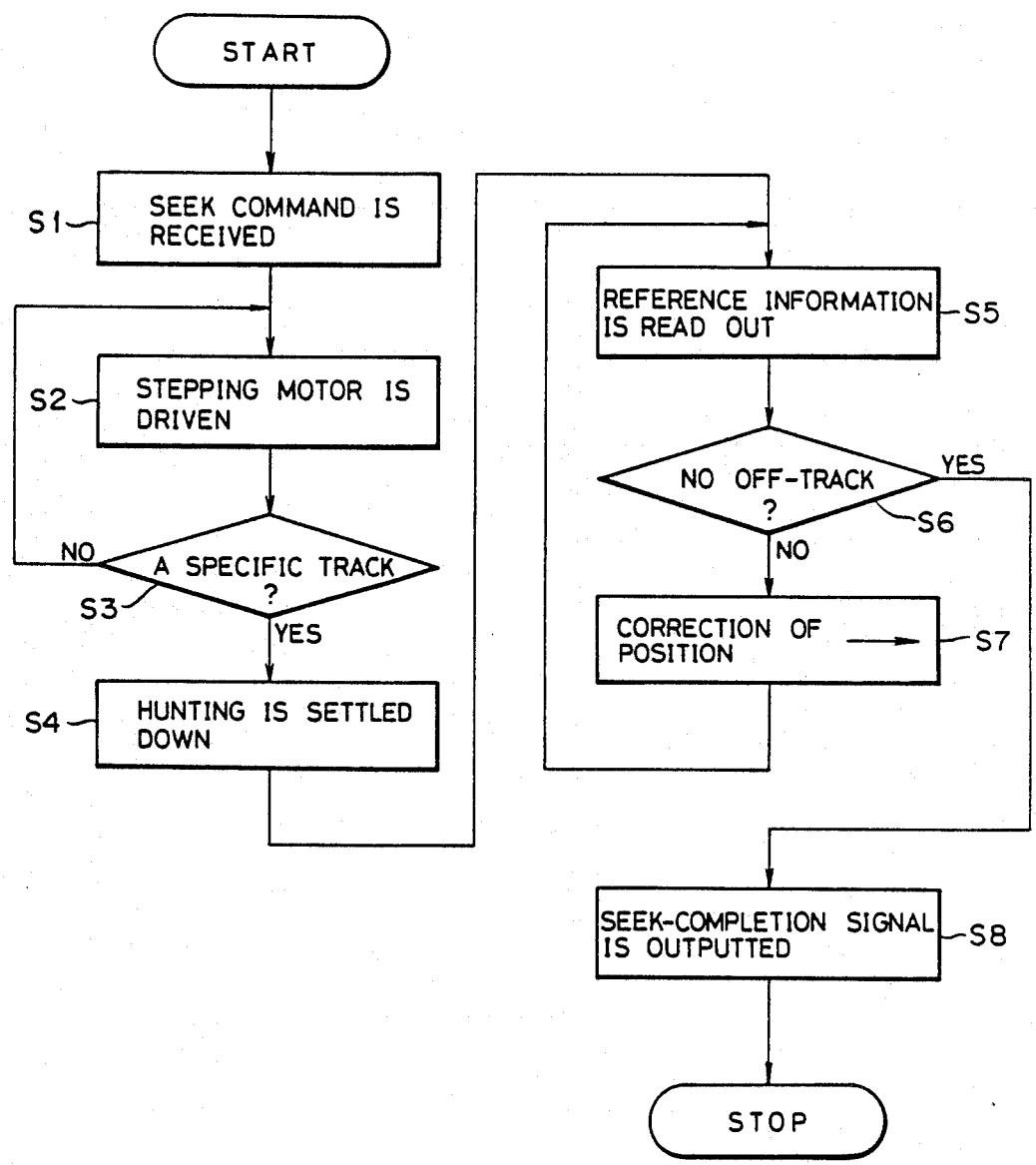
FIG. 2 is a flow chart of the seek operation for positioning a head along a proper track in the prior art head position control method.

According to the present invention, reference information is stored in regions 1b, 1c, 1d and 1e, as shown in FIG. 3. In FIG. 3, two discs 1 are securely fixed to a spindle shaft 4 and are rotated in the direction indicated by an arrow P. Since each disc 1 has an upper surface and a lower surface, the disc storage unit shown in FIG. 3 has four disc surfaces in total. Each of the disc surface has a plurality of concentric tracks 1a. Each of reference information storage regions 1b–1e is defined in one portion on each disc surface so that the portion partly interrupts the tracks in the circumferential direction thereof. The reference information storage regions are spatially displaced from each other and in the embodiment shown in FIG. 3, the regions are equi-angularly spaced from each other by 90°.

When the reference information regions 1b–1e are defined as described above, the reference information is read out n times through a plurality of heads, each in opposed relationship with its corresponding disc surface during one rotation of the discs 1. In the case of FIG. 3, the reference information in the regions 1b–1e is sequentially read out four times in the order of the regions 1b–1e. As a result, a sampling time required for reading out the reference information can be shortened to 1/n. Of course, every time that the reference information is read out during one rotation of the discs 1, the off-track of each head from its proper position is detected and in response to the detected off-track, i.e., deviation, the position of the head is corrected.

It is preferable that a mutual displacement of a plurality of reference information regions is equal to each other and the whole circumference of the disc is equiangularly divided, since a position control system therefor can be made simple in construction. It is desirable that the reference information is stored at one position on each disc surface, in order that a storage capacity of each disc can be maximized, as in the case of the prior art index burst system. Of course, when the disc storage unit has a plurality of discs, it is not always necessary to write the reference information on each disc surface and the reference information may be stored only in a plurality of disc surfaces selected from all of the disc surfaces.

An advantageous embodiment of operation for sequentially reading out the reference information stored in the manner described above to control the position of each head in response to the thus read-out reference information, will be described hereinafter.

Figure 4:
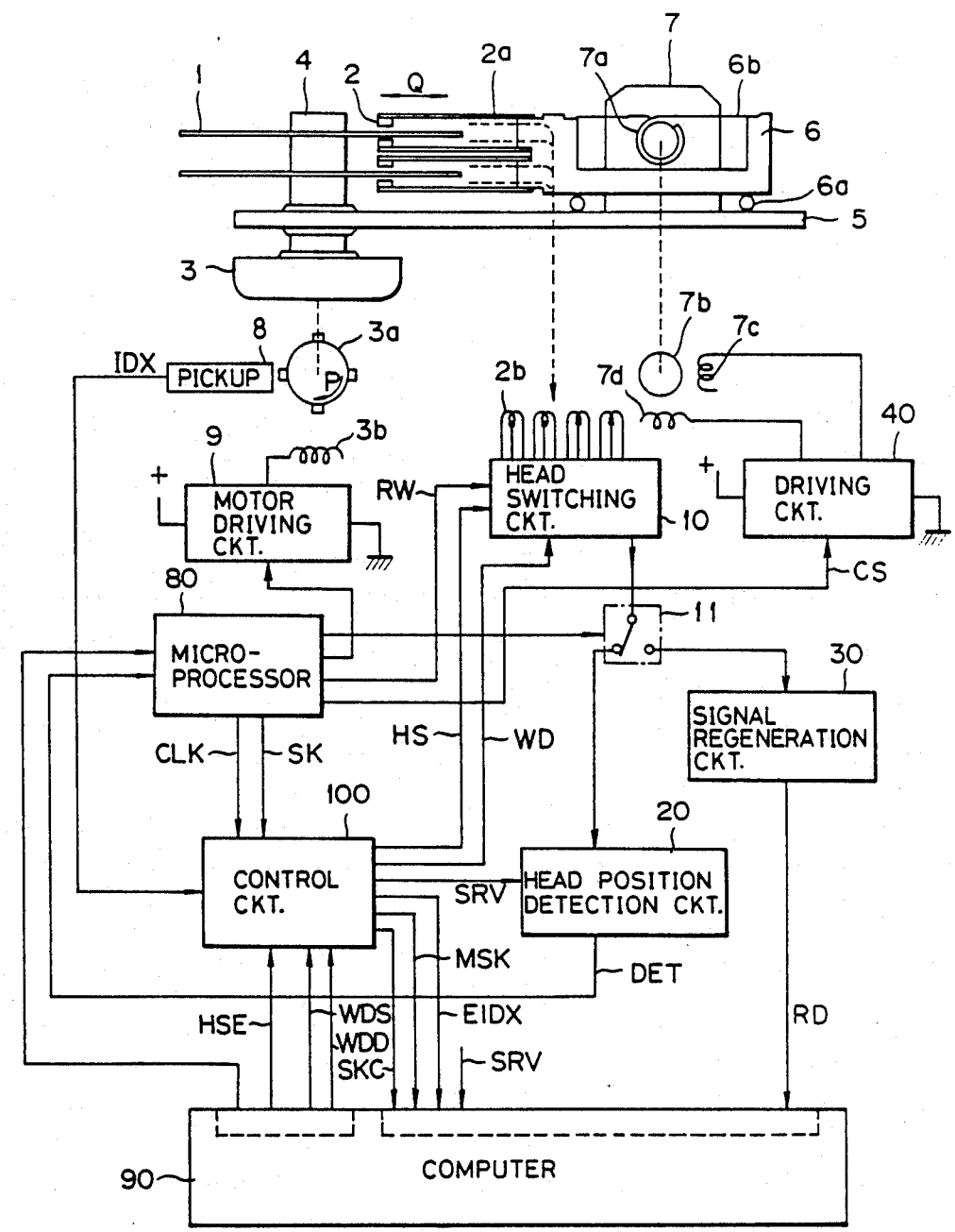
FIG. 4 is a block diagram showing a whole arrangement of a disc storage unit together with its associated computer to which a head position control method in accordance with the present invention is applied.

FIG. 4 shows an embodiment of a whole arrangement of a disc storage unit including a computer 90 to which the present invention is applied. In FIG. 4, a major mechanical structure is schematically shown in the upper portion and a block diagram of circuitry adapted to carry out the method of the present invention is shown between the upper portion and the lower portion showing the computer 90.

The disc storage unit shown in FIG. 4 has the two discs 1 and four read/write heads 2 which are disposed in opposed relationship with corresponding surfaces of the discs 1. The discs 1 are carried by the spindle 4 and are rotated at a predetermined high rotational speed by a spindle motor 3. A head supporting member 6 is movably supported through guide means 6a such as rollers on a stationary member 5 of the disc storage unit. The head supporting member 6 supports the heads 2 in common through supporting springs 2a, respectively. The head supporting member 6 is coupled to the heads 2 through a capstan 7a securely attached to the shaft of a stepping motor 7 and a thin metal band 6b wrapped around the capstan 7a. Accordingly, in response to the forward or backward direction of rotation of the stepping motor 7, the heads 2 are reciprocated in the directions indicated by a double-pointed pointed arrow Q. The rotor 3a of the spindle motor 3 is driven by a stationary coil 3b energized by a spindle motor driving circuit 9 and an angle of the rotation of the rotor 3a is detected by a sensor or pickup device 8 which in turn generates index pulses IDX which determine a reference timing for the operation of a control circuit 100. It is to be noted that unlike the prior art system, in this embodiment, one rotation of the discs 1 generates four index pulses IDX, as illustrated in FIG. 5B.

Figure 5A:
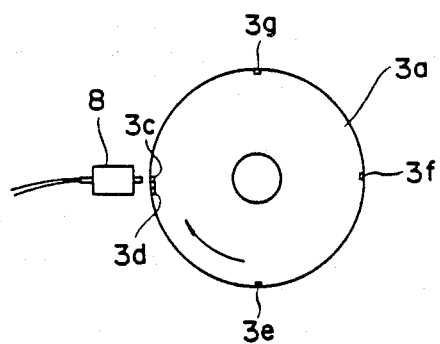
FIG. 5A is a plan view showing an arrangement for generating sync index pulses to be applied to a control circuit in an embodiment of the present invention.
Figure 5B:
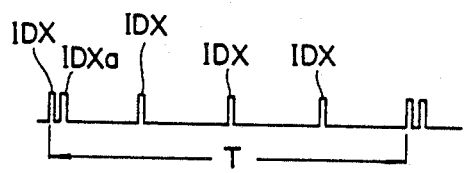
FIG. 5B is a waveform diagram illustrating a waveform of the sync index pulses.

That is, as illustrated in FIG. 5B, during one period of rotation T of the disc 1, the four index pulses IDX are generated. Here, the first index pulse IDX is succeeded by an auxiliary index pulse IDXa, thereby forming a double-pulse. The index pulses IDX correspond to the reference information 1b-1e on the disc surfaces, respectively, and define the reference timing at which the reference information is read out and necessary data is written or read out. The auxiliary index pulse IDXa is used to identify the first index pulse of the four index pulses IDX. The index pulse train can be easily produced by detecting positions of small magnets 3c-3g, distributed around and attached to the peripheral edge of the rotor 3a of the spindle motor 3 or an independent disc, by the magnetic pickup device 8. The two small magnets 3c and 3d disposed closely as shown in FIG. 3 are used to produce the above-described double-pulse.

However, it is not necessarily required to generate the auxiliary index pulse IDXa as one pulse of the double pulse. For instance, another pickup device can be provided so that the auxiliary index pulse IDXa is produced by the second pickup device and is supplied to the control circuit 100 independently of the index pulses IDX from the first pickup device.

Furthermore, instead of generating a plurality of index pulses during every period of one rotation T, only one index pulse may be generated during every period of one rotation T like the prior art system and one period of rotation is divided into a plurality of time intervals by using a conventional PLL circuit to generate respective index pulses at each divided time position. In this case, the one index pulse from the pickup device 8 may be used as the first index pulse, so that it is not necessary to generate the auxiliary index pulse IDXa.

Each coil 2b of each of the four heads 2 is shown as a coil having a center tap and is connected to a head switching circuit 10. As is well known in the art, the head switching circuit 10 selects one of the four coils 2b. That is, in response to a head switching signal HS consisting of two bits, the head switching circuit 10 selects the coil 2b corresponding to the received head switching signal HS and in response to a read/write command RW, the selected coil 2b is switched to the write mode or read mode. The head selection signal HS is delivered from the control circuit 100, while the read/write command RW is delivered from a microprocessor 80. The microprocessor 80 is incorporated to control the disc storage unit, as in the case of the conventional disc storage unit. Therefore, it is to be noted that of various functions to be accomplished by the microprocessor 80, only those associated with the present invention are shown in FIG. 4.

When the reading mode is instructed by the read/write command RW from the micro-processor 80, the head switching circuit 10 is switched to the read mode. Then, the read-out output is applied to a head position detection circuit 20 or a signal regeneration circuit 30 through a switching circuit 11 actuated in response to a command delivered from the microprocessor 80.

Figure 5C:
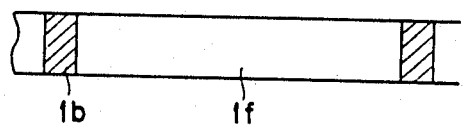
FIG. 5C is an explanatory diagram showing positions of reference information on a track in one embodiment of the present invention.

The head position detection circuit 20 receives the read-out output of the reference information from the region 1b so as to detect the off-track of the head 2. Any type of a conventional circuit capable of detecting a deviation of the head by servo information may be employed. A detection output signal DET representative of an off-track of the head 2 is applied to the microprocessor 80. In this embodiment unlike the prior art disc storage unit, the reference information is written into the region 1b immediately succeeding the index pulse IDX in the track having the reference information, as shown in FIG. 5C. The control circuit 100 supplies a servo command SRV in synchronism with the index pulse IDX to the head position detection circuit 20 in order to instruct a timing of reading out the reference information from the above-described region 1b to the head position detection circuit 20.

The access to the region 1f in which necessary data is stored must not be overlapped with the read time for reading out the reference information in the region 1b.

Figure 5D:
FIG. 5D is a waveform diagram illustrating a waveform of sync index pulses delivered from the control circuit to a computer.

For this purpose, after the read time required for reading out the reference information in the region 1b has elapsed in response to the index pulse IDX, the control circuit 100 eliminates the above-described servo command SRV and then delivers an exterior index pulse EIDX to the computer 90, as illustrated in FIG. 5D. In this embodiment, the reading of desired information is not made in response to the index pulse IDX unlike the prior art disc storage unit, but is made in response to the exterior index pulse EIDX delivered from the control circuit 100. In this case, the switching circuit 11 is switched to the signal regeneration circuit 30 and the read out data is transferred to the computer 90. In this case, any suitable conventional signal regeneration circuit may be employed as the circuit 30. The writing of the reference information into the region 1b and desired information into the region 1f is also controlled by the control circuit 100, as will be described in detail hereinafter.

When the head position detection circuit 20 supplies a detection signal DET to the microprocessor 80, the microprocessor 80 computes a required degree of control in response to the detection signal DET representative of an amount of the off-track of the head 2 and then delivers a head position correction signal CS to a driving circuit 40 of the stepping motor 7, as in the case of the conventional disc storage unit. As is well known in the art, the stepping motor is usually a two-phase motor and a stationary position at which the rotor 7b is maintained stationary is controlled by varying the directions and relative magnitudes of the respective currents flowing through two phase coils 7c and 7d.

Any suitable conventional circuit capable of accomplishing the above-described function may be used as the driving circuit 40. For instance, the correction command CS includes data for designating ON/OFF and the directions of the currents flowing through the respective phase coils 7c and 7d and data designating current values of the respective currents flowing through the phase coils 7c and 7d. The driving circuit 40 generates a pulse-width-modulated signal having a duty ratio corresponding to the current value data. Switching circuit is incorporated in the driving circuit 40 in such a way that the switching circuit is closed so that a current flows through the phase coil 7c designated by the correction command CS in the designated direction only for a period of time designated by the pulse-width-modulated signal.

Figure 6:
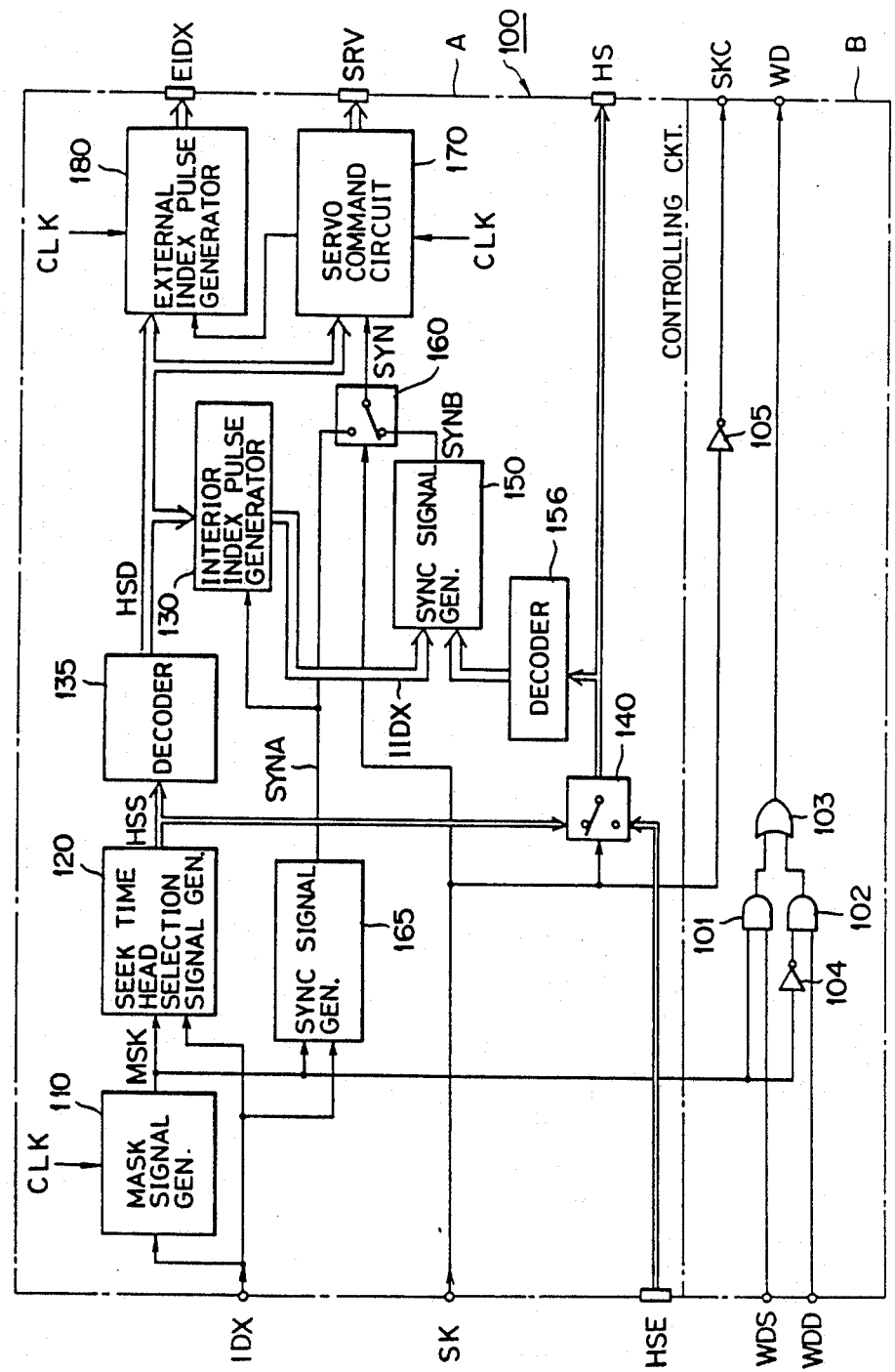
FIG. 6 is a block diagram showing an embodiment of a control circuit in a disc storage unit adapted to carry out the present invention.
Figure 7:
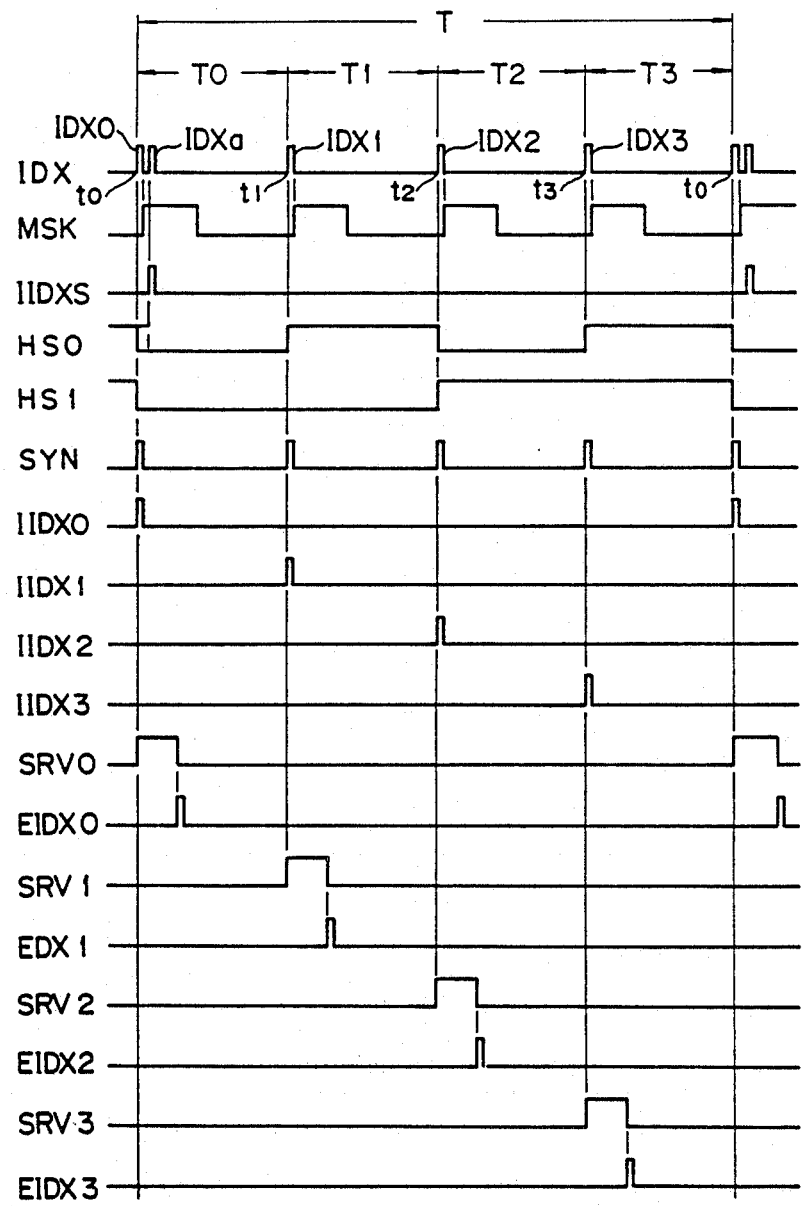
FIG. 7 is a waveform diagram illustrating various signals in the control circuit.

One embodiment of the control circuit 100 is shown in FIG. 6 and the waveforms of various signals associated with the control circuit 100 are illustrated in FIG. 7. An embodiment of a circuit arrangement in a block A enclosed by the dash-and-dotted lines in FIG. 6 is shown in detail in FIG. 8.

Now referring to FIGS. 6, 7 and 8, the arrangement and the operations of the control circuit 100 will be described in detail hereinafter.

The seek signal SK is one of the important signals including the index pulses IDX which are received by the control circuit 100. In response to a request from the computer 90, the seek signal SK is delivered from the microprocessor 8 to the control circuit 100 so that the operation of the control circuit 100 is switched depending upon the seek mode or non-seek mode. To this end, the operation switching circuits 140 and 160 are provided. However, regardless that the control circuit 100 is in the seek mode or in the non-seek mode, a mask signal generator 110 receives the index pulses IDX to generate a mask signal MSK synchronized with the index pulse IDX for a predetermined period of time. Only during this predetermined period of time, the mask signal MSK permits the writing or reading of the reference signal 1b, while prohibiting the writing or reading of desired information.

Figure 8:
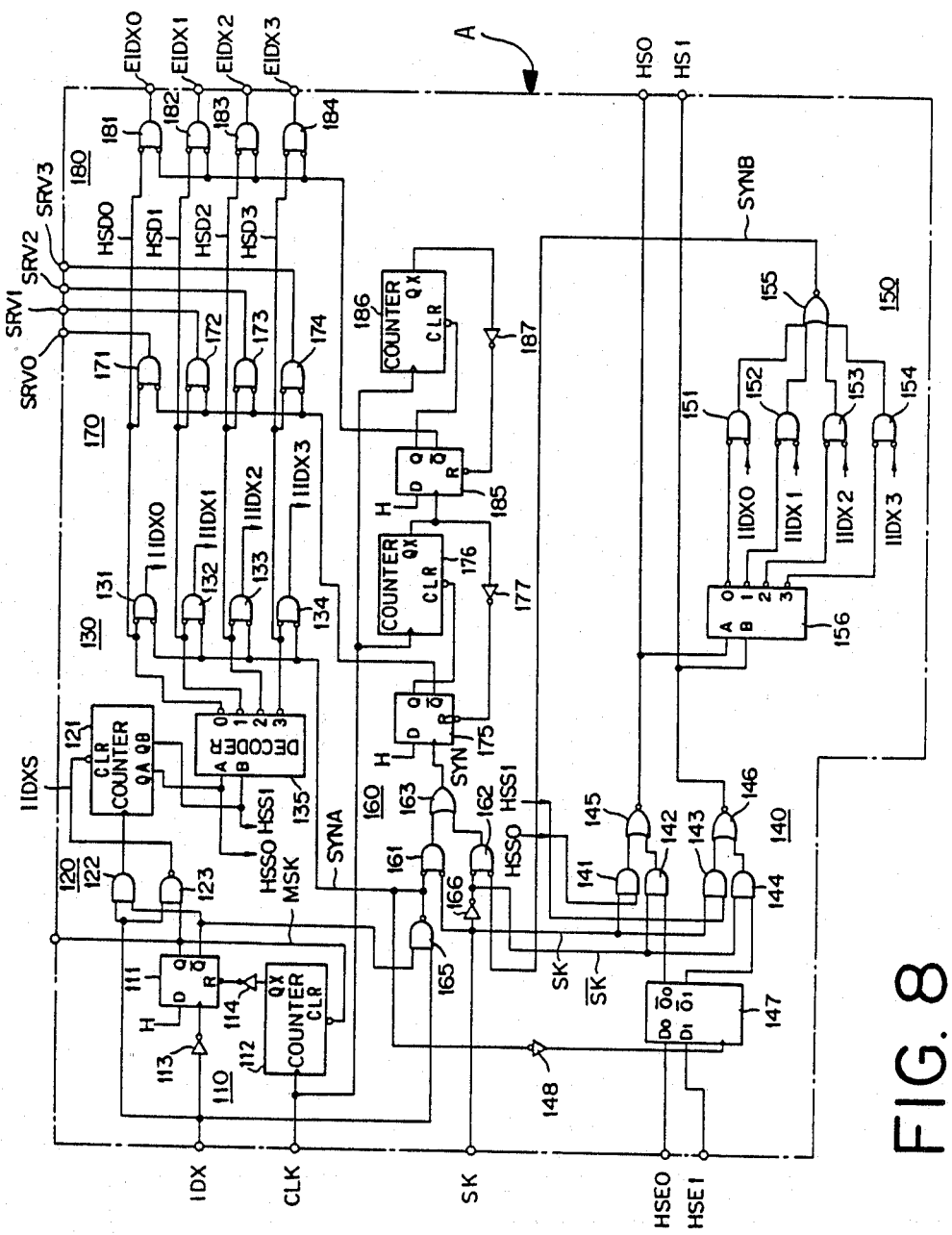
FIG. 8 is a circuit diagram showing a detailed embodiment of the portion A in FIG. 6.

As best shown in FIG. 8, the mask signal generator 110 comprises a flip-flop 111 and a counter 112. The flip-flop 111 is set in synchronism with the trailing edge of the index pulse IDX received through an inverter 113, so that the mask signal MSK is derived from the Q output thereof. Simultaneously, the counter 112 is cleared in response to the Q output to start counting the clock pulses CLK. The above-described period of the time elapses after the start of the counting of the clock pulses and when the output is derived from the count output Qx, the flip-flop 111 is reset through an inverter 114 so that the mask signal MSK disappears. As illustrated in FIG. 7, the mask signals MSK are generated four times in sychronism with the four index pulses IDX0–IDX3, respectively, during the period of one rotation T.

A seek-time head selection signal generator 120 generates seek-time head selection signals HSS for sequentially designating the heads 2 (head numbers 0–3) during four time periods T0–T3 which are started in response to the index pulses IDX0–IDX3 during the period of one rotation T as illustrated in FIG. 7. The seek-time head selection signal generator 120 includes a two-stage binary counter 121, an AND gate 122 and a NAND gate 123. In response to the first index pulse IDX0, the Q output of the flip-flop 111 within the mask signal generator 110 of at a high state "H" so that the AND gate 122 which receives the $\overline{Q}$ output and the index pulse IDX is opened in response to the first index pulse IDX0 to deliver a count pulse to the counter 121. However, when the next auxiliary index pulse IDXa is applied to the AND gate 122, the mask signal MSK has been already generated and the $\overline{Q}$ output of the flip-flop 111 is maintained at a low "L" level, so that the AND gate 122 is closed and consequently no count pulse is applied to the counter 121.

In this case, on the other hand, the NAND gate 123 receives the "H" Q output from the flip-flop 111, and accordingly the NAND gate 123 is opened in response to the auxiliary index pulse IDXa to generate a start index pulse IIDXS as illustrated in FIG. 7, so that the counter 121 is cleared to zero. That is, in response to the auxiliary index pulse IDXa, the NAND gate 123 functions to clear the counter 121 to zero at every time that the period of one rotation T starts. The AND gate 122 is opened again in response to the index pulses IDX-1–IDX3 in a manner substantially similar to that described above to deliver the count pulses to the counter 121 which in turn counts up the index pulses, so that the seek-time head selection signals HSS0 and HSS1, each of which consists of two bits to indicate digits 0, 1, 2 and 3 which correspond to the index pulses IDX0–IDX3, are derived from the count stages QA and QB of the counter 121. The waveforms of the seek-time head selection signals HSS are shown as the head selection signals HS0 and HS1 in FIG. 7. The two-bit seek-time head selection signals HSS are applied to the two input terminals A and B of a decoder 135 and in response to a value of the seek-time head selection signals HSS, head selection data signals HSD0–HSD3, one of which is at a high "H" output are derived from the four output terminals 0–3 of the decoder 135.

The $\overline{Q}$ output of the flip-flop 111 in the mask signal generator 110 is also applied to one input terminal of a sync signal generator 165 formed by a NAND gate. In response to the index pulses IDX0–IDX3 applied to the other input terminal of the NAND gate 165, the NAND gate 165 is opened, but in response to the auxiliary index pulse IDXa, the NAND gate 165 is inhibited by the $\overline{Q}$ output from the flip-flop 111 which is a complementary signal of the index pulses IDX0–IDX3 and accordingly remains closed. Therefore, the sync signal SYNA from the sync signal generator 165 has a repetition of a single pulse obtained by removing the auxiliary index pulses IDXa from the index pulses IDX, as shown at SYN in FIG. 7.

In response to the four head selection data signals HSD from the decoder 135 and the sync signal SYNA, an interior index pulse generator 130 generates interior index pulses IIDX0–IIDX3, as illustrated in FIG. 7. The interior index pulse generator 130 includes four AND gates 131–134, each having inverting input terminals.

The operation switching circuit 140 for the head selection signal includes four AND gates 141–144 adapted to select the seek-time head selection signal HSS or an exterior head selection signal HSE from the computer 90 in response to the seek signal S, two NOR gates 145 and 14 and a latching circuit 147. Of the AND gates 141–144, the AND gates 141 and 143 are enabled in response to the seek signal SK only during the seek time, while the AND gates 142 and 144 are enabled in response to the complementary signal of the seek signal SK only during the non-seek time. The respective bits of the seek-time head selection signal HSS are applied to the AND gates 141 and 143, while the respective bits of the exterior head selection signal HSE are applied to the AND gates 142 and 144 through the latching circuit 147. Therefore, in case of the seek mode, the bits which constitute the seek-time head selection signal HSS are applied to the NOR gates 145 and 146. In case of non-seek mode, the bits which constitute the exterior head selection signal HSE are applied to the NOR gates 145 and 146, so that the control circuit 100 generates the two-bit head selection signals HS0 and HS1 to the head switching circuit 10. The sync signal SYNA is applied through an inverter 148 to the edge trigger input of the latching circuit 147, so that the value of the exterior head selection signal HSE is changed in synchronism with the sync signal SYNA and is outputted as the head selection signal HS.

Second sync signal generator 150 generates a sync signal SYNB in response to the selected head selection signal HS. The sync signal generator 150 has a decoder 156. The two input terminals A and B of the decoder 156 receives the selected head selection signal HS, in response to which one of the four outputs is rendered to a high level "H". AND gates 151–154, each having inverting input terminals receive four outputs, respectively, and the interior index pulses IIDX0–IIDX3, respectively. The AND gate of the AND gates 151–154 corresponding to the selected head selection signal HS is opened in synchronism with the corresponding interior index pusle IIDX. A NOR gate 155 receives all the outputs from these AND gates so that its output of sync signal SYNB is similar to the waveform SYN shown in FIG. 5.

Like in the case of the sync signal SYNA from the sync signal generator 165, the sync signal SYNB is of course a pulse train synchronized with the index pulses IDX, but the sync signal SYNB is different from the sync signal SYNA in that in case of non-seek mode, the sync signal SYNB is outputted in response to the value of the exterior head selection signal HSE.

Second operation switching circuit 160 includes two AND gates 161 and 162, each having inverting terminals and an OR gate 163. During the seek time, the AND gate 162 is enabled in response to the seek signal SK, while the AND gate 161 is enabled during the non-seek time. Therefore, the OR gate 163 which receives both the outputs from the AND gates 161 and 162 supplies the sync signal SYNB during the seek time and the sync signal SYNA as the sync signal SYN during the non-seek time to a servo command circuit 170.

The servo command circuit 170 includes four AND gates 171–174, each having inverting inputs, a flip-flop 175 and a counter 176 to generate the servo command SRV0–SEV1 synchronized with the index pulses IDX in response to the value of the seek-time head selection signal HSS. The flip-flop 175 is reset in response to each pulse of the above-described sync signal SYN and in response to the Q output from the flip-flop 175 the counter 176 is cleared to start counting the clock pulses CLK. The counter 176 determines a time period of each servo command SRV and when the output Qx is derived after a predetermined time period, the flip-flop 175 is reset by the output Qx through an inverter 177. The head selection data signals HSD0–HSD3 are applied to one input terminal of each of the AND gates 171–174, while the $\overline{Q}$ output from the flip-flop 175 are applied to the other input terminal thereof. Therefore, the AND gate designated by the seek-time head selection signal HSS is opened only during the time that the flip-flop 175 is set, so that the servo commands SEV-0–SRV3 having a time width set by the counter 176 are generated as shown in FIG. 7.

An exterior index pulse generator 180 is substantially similar in construction to the servo command circuit 170 and has a flip-flop 185 which is set in synchronism with the trailing edge of the output from the counter 176; that is, each of the servo commands SRV. The generator 180 has a counter 186 used to determine a pulse duration of the exterior index pulse. The counter 186 is cleared in response to the Q output derived from the flip-flop 185 when the flip-flop 185 is set and then the counter 186 starts counting the clock pulses CLK. After a short time interval, the Qx output is derived from the counter 186 and applied through an inverter 187 to the flip-flop 185 so as to reset the flip-flop 185. Each of the head selection data signals HSD0–HS3 is applied to one input terminal of each of the AND gates 181–184, respectively, while the Q output from the flip-flop 185 is applied in common to the other input terminals thereof. Therefore, the AND gate designated by the seek-time head selection signal HSS delivers the exterior index pulse EIDX0, EIDX1, EIDX2 or EIDX3 in synchronism with the trailing edge of the servo command SRV0, SRV1, SRV1, SRV2 or SRV3. The waveforms of these exterior index pulses are shown in FIG. 7.

In FIG. 6, the gate group shown in the lower block B enclosed by the dash and dotted chain lines is used to write information on a disc and receives the reference information data WDS and the general information data WDD including desired data and the formatting data to be written into the region except the region into which the reference information is written from the computer 90, as indicated on the left side of the block B. In the block B, an AND gate 101 is enabled in response to the mask signal MSK, while an AND gate 120 receives the mask signal MSK through an inverter 104, so when it is enabled only that the mask signal MSK does not appear. Therefore, during the time that the mask signal MSK appears, the writing of the reference information data WDS is permitted, but the writing of the general information data WDD is inhibited. As a result, an erroneous refreshment of the stored reference information in case of the disc formatting or the writing of other information can be prevented. Both the output signals from the AND gates 101 and 102 are applied to an OR gate 103, whose output or write data WD is applied to the head switching circuit 10 described above. An inverter 105 is used to reverse the seek signal SK to generate a seek-completion signal SKC.

So far, the circuit arrangement and the modes of operation of individual circuits have been described and now the overall operation will be described with reference to FIG. 4.

In case of the seek operation, the computer 90 delivers the seek command to the microprocessor 80 which in turn supplies the seek signal SK to the control circuit 100 to switch the switching circuit 11 to the state shown in FIG. 4. The write/read command RW is applied to the head switching circuit 10 so that the disc storage unit is switched to the read mode. Then, the command CS is repeatedly applied to the driving circuit 40 of the stepping motor 7 so as to seek for a specific track.

In this seek mode, in response to the index pulses IDX, the control circuit 100 generates $\underline{n}$ (four in this embodiment) seek-time head selection signals HSS sequentially during the period of one rotation T of the discs 1 and then delivers the signals HSS as the head selection signals HS to the head switching circuit 10, so that the heads 2 are sequentially switched. Therefore, during the period of one rotation T, $\underline{n}$ read-out signals are applied to the head position detection circuit 20 from the heads 2 which are switched in the manner described above. In synchronism with each of the $\underline{n}$ read-out signals, the control circuit 100 delivers each servo command SRV to the head position detection circuit 20, so that the head position detection circuit 20 can discriminate the reference information from other information in the read-out signal to obtain the reference information.

While the head 2 is travelling from one track to the other track, the head position detection circuit 20 cannot detect an amount of off-track from the read-out signal of the reference information, but the head position detection circuit 20 can be used in such a manner that an actual travelling distance of the head 2 is calculated by counting the number of the read-out signal of the reference information so as to detect whether or not the head 2 reaches a desired reference information.

After the head 2 has reached the specific track, the head position detection circuit 20 detects an amount of off-track of the head from the normal position of the head and then delivers the detected off-track to the microprocessor 80. In response to the received off-track, the microprocessor 80 corrects the position of the head in the manner described above. When the head 2 is brought to its normal position and its off-track becomes within a tolerable range, the microprocessor 80 interrupts the seek signal SK, so that the control circuit 100 delivers the seek-completion signal SKC to the computer 90 to report that the whole seek operation is accomplished.

In case of reading information from the track thus seeked after the computer 90 has received the seek-completion signal SKC, the computer 90 delivers the read command to the microprocessor 80 to switch the switching circuit 11 to the position opposite to the position indicated in FIG. 4. Then, the exterior head selection signal HSE is applied to the control circuit 100 from the computer 90 so as to specify a desired disc surface from which desired information is to be read out. In this case, of course, the seek signal SK has already disappeared, so that the control circuit 100 selects the exterior head selection signal HSE derived from the computer 90 as the head selection signal HS and delivers the head selection signal HS to the head switching circuit 10.

As a result, the desired readout data RD is transferred through the switching circuit 11 and the signal regeneration circuit 30 to the computer 90, so that the computer 90 starts the read operation in synchronism with the exterior index pulses EIPX delivered from the control circuit 100. Even when the head 2 is already positioned above a desired track from which the stored information is desired to be read out, the computer 90 first delivers the seek command to the microprocessor 80 and after the computer 90 comfirms that the head 2 is at the normal position on the desired track in response to the seek-completion signal SKC from the control circuit 100, the read operation is first started.

In case of writing information into a track, the computer 90 first delivers the seek command to the microprocessor 80 as in the case of the seek operation described above and the exterior head selection signal HSE is applied to the control circuit 100 to start the seek operation. In response to the seek-completion signal SKC from the control circuit 100, the write command is applied to the microprocessor 80, so that the head switching circuit 10 is switched into the write mode. When the information to be written is the general information data WDD, the data WDD is applied to the control circuit 100 in synchronism with the exterior index pulse EIDX. The control circuit 100 delivers the data WDD as the data WD to be written to the head switching circuit 10. As described above, this operation is interlocked by the mask signal MSK in the control circuit 100, so that there is no possibility that the general information data WDD is erroneously written into the reference information storage region to eliminate the reference information already stored therein.

When the information to be written is the reference information data WDS, the computer 90 delivers the reference information data WDS to the control circuit 100 in synchronism with the mask signal MSK from the control circuit 100. In this case, there is no possibility that the reference information is stored in a region outside the reference information storage region, because the reference information data WDS is interlocked with the mask signal MSK described above. In most cases, the reference information data WDS is in the form of a simple ON/OFF digital data or an analog data, it is not needed to specially deliver the data WDS from the computer 90 to control circuit 100. It is possible to incorporate a simple pattern data generator into the control circuit 100, so that in this case it is sufficient to deliver the reference information write command from the computer 90 to the control circuit 100 and it is not needed to apply the mask signal MSK to the computer 90.

As is clear from the above-described explanation of the mode of operation, even though the position of reference information on a disc or the starting position of tracks on each disc surface are spatially displaced from each other, the heads are sequentially switched at a correct timing in synchronism with the starting position of each track or each index pulse by the control circuit 100. Therefore, even when the computer 90 delivers various commands to the disc storage unit like in a prior art case that the leading ends of all tracks are spatially aligned with each other, the information is read out or written at a correct position without erroneous operation. Furthermore, even in a case that, in addition to the conventional index pusles, the control circuit generates the exterior index pulses, there is no problem even when the computer handles the exterior index pulses as the conventional index pulses.

As described above, according to the present invention, in the case of the data-surface-servo type disc storage unit, the reference information storage regions on a plurality of disc surfaces are displaced from one disc surface to another with respect to the spatial position relationship between the disc surfaces and the heads corresponding to the respective disc surfaces. The reference information is read out from the plurality of mutually displaced reference information storage regions on a plurality of disc surfaces during one rotation of the discs. Every time that the reference information is read out, a deviation of the head from the normal position on a specific track is detected, and in response to the detected deviation, the head is brought to the normal position. Therefore, if reference information is stored on n disc surfaces and is spatially displaced from each other, the sampling period for detecting an amount of off-track of the head from its normal position can be shortened to 1/n and consequently the data access time of the disc storage unit can be shortened by the order to several tens of percent.

Even though the present invention is equivalent to a case where one disc surface stores reference information a few times more than in the conventional method, the area of the reference information storage regions is substantially equal to that in the conventional data-surface-servo system, so that the access time can be shortened without sacrificing the data storage capacity of the disc storage unit.

In addition, the present invention is essentially suitable for the writing of data by a soft sector format. Even though the position of the reference information storage region varies from one disc surface to another, the disc surfaces are substantially similar to the conventional disc surfaces when viewed from the computer. Therefore, the disc storage unit can be operated in a manner substantially similar to that the conventional disc storage unit with a soft sensor format, so that the merits of the soft sector format can be fully utilized and from the standpoint of software, no burnden is imposed on a user.

What is claimed is:

1. A disc storage unit including a plurality of disc surfaces each having a plurality of tracks concentrically arranged thereon for storing data, the plurality of disc surfaces being rotatably driven in common, and a plurality of heads for selectively writing and reading out data respectively into and from respective ones of the plurality of disc surfaces, the positions of the plurality of heads being controllably variable relative to the respective ones of the plurality of disc surfaces, comprising:

a plurality of reference information regions in which is written reference information for determining the positions of said plurality of heads, said plurality of reference information regions being disposed respectively on respective ones of said plurality of disc surfaces on one portion thereof, each of said one portion being disposed on a respective one of said plurality of disc surfaces such that it interrupts each of said plurality of tracks thereon, each of said plurality of reference information regions being angularly offset from one another;

means for producing an index pulse synchronized with the rotation of said plurality of disc surfaces;

means for producing a seek signal during a seek period required for one of said plurality of heads to reach a desired track;

means for producing a seek-time head selection signal for sequentially selecting one of said plurality of heads in synchronism with said index pulse during a single revolution of said plurality of disc surfaces;

means for selecting one of said seek-time head selection signal and an exterior head selection signal, said seek-time head selection signal being selected when said seek signal is present and said exterior head selection signal being selected when said seek signal is not present, said means for selecting outputting the selected one as a head selection signal;

head switching means responsive to said head selection signal for selecting one of said plurality of heads;

means for producing an interior index pulse corresponding to detection of each of said plurality of reference information regions in synchronism with said index pulse;

means for reading a portion of one of said plurality of reference information regions by the selected one of said plurality of heads, the reading occurring in synchronism with said interior index pulse, to obtain information used for correcting a position of the selected one of said plurality of heads; and means for producing an exterior index pulse in response to said exterior head selection signal when said interior index pulse corresponding to said head selection signal is terminated, to enable the selected one of said plurality of heads to selectively read out and write data respectively from and into a respective one of said plurality of disc surfaces when the interior index pulse corresponding to said head selection signal is terminated.

2. A disc storage unit as claimed in claim 1, wherein each of said plurality of reference information regions are respectively defined at one position in the circumferential direction on respective ones of said plurality of disc surfaces and are equi-angularly displaced sequentially from a first one of said plurality of reference information regions on a first one of said disc surfaces to a next one of said plurality of reference information regions on a next one of said plurality of disc surfaces.

3. A disc storage unit as claimed in claim 1, wherein said plurality of reference information regions respectively disposed on said plurality of disc surfaces are mutually displaced from a first one of said reference information regions on a first one of said disc surfaces to another one of said reference information regions on another one of said disc surfaces.

4. A disc storage unit as claimed in claim 1, wherein said means for reading a portion of one of said reference information regions includes means for generating a plurality of index pulses during each revolution of said plurality of disc surfaces in accordance with the number of disc surfaces upon which said plurality of reference information regions are disposed.

5. A disc storage unit as claimed in claim 4, wherein one of said plurality of index pulses is generated in the form of a composite pulse which is different from any other one of said plurality of index pulses produced during each revolution, which thereby determines a sequential order of said plurality of index pulses produced during each revolution.

6. A disc storage unit as claimed in claim 1, further comprising:
said means for producing a seek-time head selection signal producing a digital value in response to each of said plurality of index pulses; and
means applying said head selection signal to said head switching means to sequentially select one of said plurality of heads corresponding to said digital value of said head selection signal.

7. A disc storage unit as claimed in claim 6, wherein said head selection signal is generated independently of a second head selection signal used when a position of the selected one of said plurality of heads is not being controlled and in response to said seek signal for commanding the position of the selected one of said plurality of heads, said means for selectively applying said head selection signal selectively applying one of said head selection signal and said second head selection signal to said head switching means.

8. A disc storage unit as claimed in claim 1, wherein each of said plurality of reference information regions is disposed only at one position located at the leading end of each of said plurality of tracks.

9. A head position control method for a disc storage unit having a plurality of disc sufraces on each of which are concentrically arranged a plurality of tracks for storing data, the plurality of disc surfaces being rotatably driven in common, and a plurality of heads for writing or reading out data respectively into or from respective ones of said plurality of disc surfaces, the radial positions of said plurality of heads being variable relative to the respective ones of said plurality of disc surfaces, comprising the steps of:
providing a plurality of reference information regions, in which reference information for determining the radial position of the respective one of said plurality of heads is written, on one portion of each respective one of said plurality of disc surfaces in such a way that each said one portion partially interrupts each of said plurality of tracks such that each said one portion is relatively offset from each respective one of said plurality of heads by a different angular amount;
producing an index pulse synchronized with the rotation of said plurality of disc surfaces;
producing a seek signal during a seek period, said seek period being the time required for one of said plurality of head to reach a desired track;
producing a seek-time head selection signal for sequentially selecting one of said plurality of heads in synchronism with said index pulse during a single revolution of said plurality of disc surfaces;
selecting one of said seek-time head selection signal and an exterior head selection signal received from an exterior computer, said seek-time head selection signal being selected when said seek signal is present, otherwise said exterior head selection signal being selected, and outputting the selected signal as a head selection signal;
selecting one of said plurality of heads in response to said head selection signal;
producing an interior index pulse corresponding to detection of each of said plurality of reference information regions in synchronism with said index pulse;
reading one of said reference information regions by the selected one of said plurality of heads in synchronism with said interior index pulse to obtain reference information to correct a position of the selected one of said plurality of heads; and
producing an exterior index pulse for reading out or writing data from or into said plurality of disc surfaces in response to said exterior head selection signal received from the exterior computer when said interior index pulse corresponding to said head selection signal is terminated.

10. A head position control method as claimed in claim 9, wherein each of said plurality of reference information regions are defined at one position in the circumferential direction on each of said plurality of disc surfaces and are equi-angularly displaced from one of said plurality of reference information regions on one of said plurality of disc surfaces to another one of said plurality of reference information regions on another one of said plurality of disc surfaces.

11. A head position control method as claimed in claim 9, wherein said regions for said reference information on said plurality of disc surfaces are mutually displaced from one of said plurality of reference information regions on one of said plurality of disc surfaces to another one of said plurality of reference information regions on another one of said plurality of disc surfaces.

12. A head position control method as claimed in claim 9, wherein said step of reading one of said reference information regions includes a step for generating a plurality of index pulses in accordance with the number of disc surfaces upon which said plurality of reference information regions are disposed.

13. A head position control method as claimed in claim 12, wherein a single one of said plurality of index pulses is generated in the form of a composite pulse, thereby determining a sequential order of said plurality of index pulses.

14. A head position control method as claimed in claim 9, wherein in the step of producing a seek-time head selection signal, further comprising generating a seek-time head selection signal having a digital value in response to each one of said plurality of index pulses; and
sequentially selecting one of said plurality of heads corresponding to said digital value of said seek-time head selection signal.

15. A head position control method as claimed in claim 14, wherein said head selection signal is generated independently of a second head selection signal used when a position of said head is not being controlled and in response to said seek signal for commanding the position of said selected one of said plurality of heads, and either one of said head selection signal and said second head selection signal is selectively used to sequentially select the head.

16. A head position control method as claimed in claim 9, wherein each of said plurality of reference information regions is defined only at one position at the leading end of each of said plurality of tracks.

* * * * *